United States Patent [19]

Swadell

[11] Patent Number: 4,637,770
[45] Date of Patent: Jan. 20, 1987

[54] SELF-EQUALIZING LIFTING TRAILER

[76] Inventor: Robert A. Swadell, 1530 Palomino Dr., Henderson, Nev. 89015

[21] Appl. No.: 776,933

[22] Filed: Sep. 17, 1985

[51] Int. Cl.4 .............................................. B60P 3/10
[52] U.S. Cl. .................................. 414/495; 254/4 R; 254/10 R; 280/414.3; 414/917
[58] Field of Search ............... 414/495, 496, 497, 498, 414/499, 500, 467, 458, 917; 254/4 R, 4 B, 4 C, 10 R, 10 B, 10 C; 280/414.3, 414.1

[56] References Cited

U.S. PATENT DOCUMENTS

| | | | |
|---|---|---|---|
| 533,059 | 1/1895 | Harthan | 254/10 R |
| 1,146,077 | 7/1915 | Juergens | 254/4 R X |
| 2,897,989 | 8/1959 | Hounsell | 414/458 |
| 2,953,266 | 9/1960 | Anderson | 414/495 |
| 3,552,556 | 1/1971 | Hall | 254/4 R X |
| 3,586,189 | 6/1971 | Tornheim | 414/498 X |
| 4,114,772 | 9/1978 | Beelow | 414/495 |
| 4,302,022 | 11/1981 | Schoeffler et al. | 414/495 X |

FOREIGN PATENT DOCUMENTS

| | | | |
|---|---|---|---|
| 901517 | 1/1954 | Fed. Rep. of Germany | 414/458 |
| 831541 | 3/1960 | United Kingdom | 254/10 C |

Primary Examiner—Frank E. Werner
Attorney, Agent, or Firm—Sughrue, Mion, Zinn, Macpeak, and Seas

[57] ABSTRACT

A lifting-type boat trailer which collapses to a substantially flat position to allow the trailer to be driven between the pontoons of a pontoon boat with its pontoons sitting on the ground. A winch fixed to the front of the trailer applies force via a cable both to the front end of the trailer through a pulley attachment and also to the rear end of the trailer through a bell crank mechanism whose effective working lever arm varies from a maximum at the collapsed position of the trailer to a minimum at the fully raised position, whereby lifting forces applied to the trailer are self-equalizing so that the maximum lifting forces are always applied to those points of the trailer which are subjected to the heaviest weight load. The maximum lifting force is automatically transferred from the rear to the front of the trailer as the trailer is raised. The cable is attached to the bell crank mechanism through a dual diameter drum and shaft assembly which provides further force-multiplication or mechanical advantage at the rear of the trailer.

3 Claims, 7 Drawing Figures

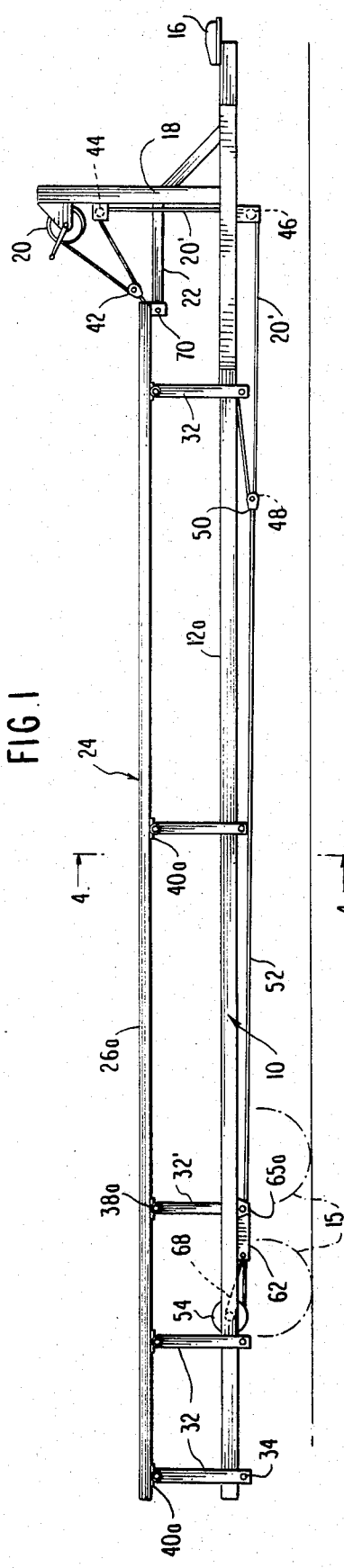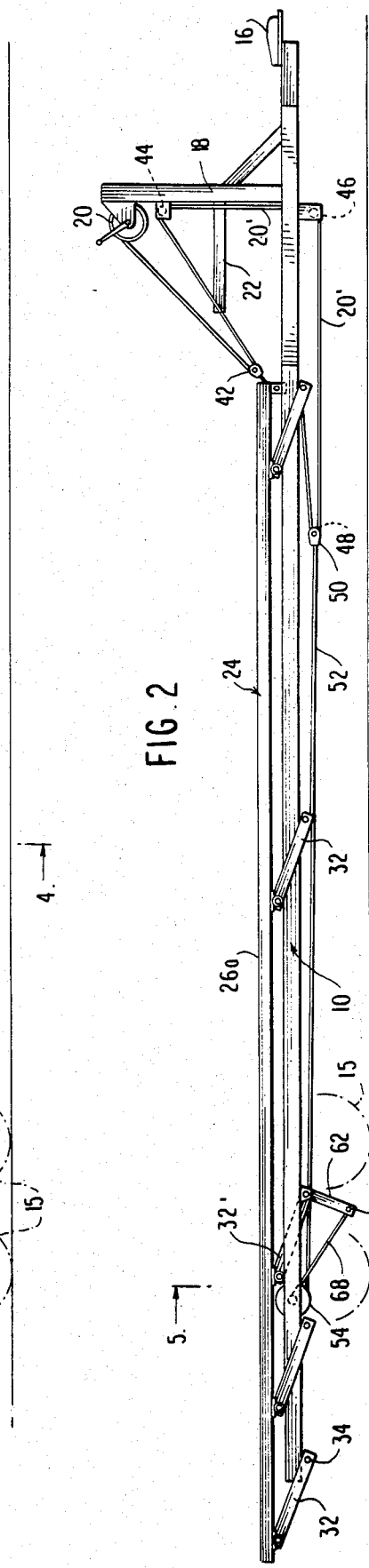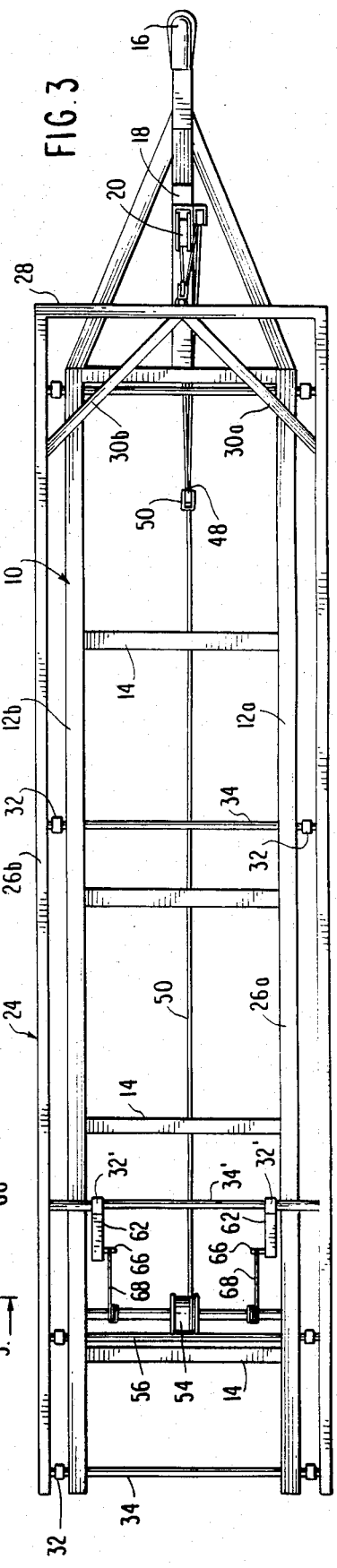

SELF-EQUALIZING LIFTING TRAILER

BACKGROUND OF THE INVENTION

1. Field of the Invention

This invention relates generally to the field of support frames for raising and lowering a load which is supported on the frame and, more specifically, to such a frame incorporating self-equalizing means which automatically distributes to points of the frame lifting forces which substantially match the load occurring at each of those points during raising of the frame. Even more specifically, the invention relates to an improved trailer, especially a boat trailer, incorporating such a frame, and even more particularly, to a pontoon-boat trailer in which the frame, in its lowered or collapsed condition, permits the trailer to be driven underneath the boat with its pontoons sitting on the ground and, then, permits the frame easily to be elevated to its upright trailering position even though the load on the rear of the frame may be much greater than that on the front of the frame.

2. Description of the Prior Art

Lifting boat trailers, per se, are generally well known, but they suffer several disadvantages. More specifically, such trailers operated by hydraulic systems are very expensive and complicated. Boat trailers having a front-mounted winch which applies a pulling force to the front end of the frame suffer from the disadvantages of requiring an unacceptably high force to be applied to the winch handle, causing bending of the frame members when such a high force is applied, and not being lowerable or collapsible to a sufficiently flat position to permit them to be driven underneath a pontoon boat sitting with its pontoons on the ground.

Lifting trailers have also been disclosed in several U.S. patents. For example, U.S. Pat. No. 4,221,420 discloses a boat-and-car trailer having a first support assembly for the car and a second support assembly for the boat. Two pairs of pivotal scissor arms are secured to opposite sides of the first and second support assemblies and are hydraulically actuated to raise the boat support assembly from a collapsed position to a boat-supporting position. U.S. Pat. Nos. 4,286,800 and 4,406,477 disclose boat trailers having a collapsible boat-supporting structure, with the latter patent disclosing a winch and a cable pulley system which is used to raise a boat-supporting frame. U.S. Pat. No. 3,974,924 discloses a boat trailer having an aft cradle which provides mechanical leverage to assist in loading and unloading a boat. U.S. Pat. No. 3,113,686, U.S. Pat. No. 4,318,632 and U.S. Pat. No. 4,365,923 further show the state of the art of lifting boat trailers.

SUMMARY OF THE INVENTION

Therefore, the primary object of my invention is to provide a load-lifting collapsible frame apparatus with self-equalizing means which distributes a lifting force to different points of the frame such that the lifting force applied at each point substantially matches the load occurring at that point during raising of the apparatus.

Another object of my invention is to provide a lifting boat trailer incorporating such self-equalizing means.

A more specific object of my invention is to provide a pontoon-boat trailer incorporating such self-equalizing means and configured so that the trailer may be driven underneath the pontoon-boat while the boat is sitting with its pontoons on the ground, and so that the frame apparatus incorporated in the trailer can be easily raised with minimum applied mechanical force even though the load on the rear end of the trailer is much heavier than that on the front end.

My invention may be broadly summarized as a raisable and lowerable support frame apparatus for a boat trailer or the like, and including an elongate horizontal lower frame, an elongate horizontal upper frame, a plurality of spaced coupling arms individually and pivotally connected at opposite ends thereof between the upper and lower frames to define therewith a parallelogram configuration with the upper frame transversely displaceable with respect to the lower frame in a pivotal mode, and first means disposed proximate a forward end of the lower frame for applying a raising force to an adjacent forward end of the upper frame, and further including second means coupled to the lower frame proximate a rear end thereof for applying to an adjacent rear end of the upper frame a raising force which varies inversely with the transverse separation distance between the upper and lower frames, and self-equalizing or self-actuating means interconnecting the first and second force applying means such that, with a load supported on the upper frame in a lowered position thereof, an enhanced raising force is initially applied to the rear end of the upper frame and, in a progressively transitional manner, such enhanced raising force diminishes as the transverse separation distance between the upper and lower frames increases.

A preferred embodiment of my invention may be described as a trailer frame apparatus, particularly intended for use with pontoon boats, catamarans and the like, and comprising:

(a) an elongate lower frame, (b) an elongate upper frame, (c) a plurality of spaced coupling arms individually and pivotally connected at opposite ends thereof between the upper and lower frames to define therewith a parallelogram configuration with the upper frame longitudinally and transversely displaceable with respect to the lower frame in a pivotal mode, (d) a winch mounted on the lower frame proximate a forward end thereof and at an elevated position relative to a raised, uppermost position of the upper frame, (e) drum means rotatably mounted on the lower frame proximate a rear end thereof, and comprising a first winding portion having a first diameter and a second winding portion having a second, smaller diameter for providing a further mechanical advantage which is readily and inexpensively selectable to adjust for the load on the apparatus, (f) bell crank means pivotally mounted at an elbow portion thereof on the lower frame proximate the rear end thereof, and comprising angled first and second arms, the second arm having a length substantially equal to that of the coupling arms and being pivotally connected at a distal end thereof to the upper frame, (g) a first cable wound around the second winding portion of the drum means and having an outer end coupled to a distal end of said first arm of said bell crank means, (h) a second cable wound around the first winding portion of the drum means and having an outer end coupled to a first reversing pulley, and (i) a third cable wound around the winch, threaded through:

(1) a second reversing pulley coupled to the upper frame, (2) third reversing pulley means coupled to the lower frame, and (3) the first reversing pulley, and terminating in attachment to the lower frame, whereby with an elongate, rearwardly heavier load supported on the upper frame in a lowered position thereof, tension applied to the third cable by the winch to raise the upper frame and load will initially exert more lifting force on the rear end of the upper frame than on the front end, and in an inherently automatic and progressively transitional manner, will ultimately exert more lifting force on the front end thereof.

Thus, my invention has particular utility in a pontoon-boat trailer, but, because of the self-equalizing or automatic lifting force-distributing feature, my invention also has utility in any environment where a collapsible elongated frame apparatus is used to raise and/or lower a load, such as at a loading dock where a load must be raised to the level of the loading platform of a truck.

BRIEF DESCRIPTION OF THE DRAWINGS

FIG. 1 is a right side elevation view of a trailer of the preferred embodiment of the invention and showing the boat-supporting collapsible frame in its "up" position.

FIG. 2 is a right side elevation view similar to FIG. 1 except that it shows the collapsible frame in its "down" position.

FIG. 3 is a top plan view of FIG. 1.

DETAILED DESCRIPTION OF THE PREFERRED EMBODIMENTS

The pontoon boat trailer of a preferred embodiment of the invention essentially comprises:

1. a lower frame structure,
2. a collapsible upper frame structure,
3. means connecting the upper frame to the lower frame,
4. means for raising the upper frame relatively to the lower frame.

1. Lower frame structure

Figure 4:
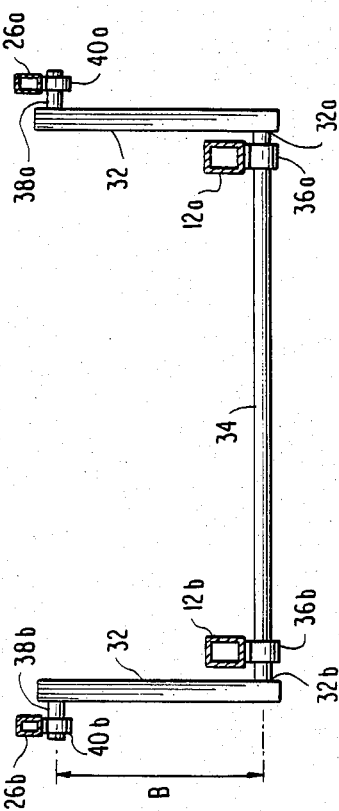
FIG. 4 and FIG. 5 are transverse sectional views taken on lines 4—4, 5—5, respectively of FIG. 2.
Figure 5:
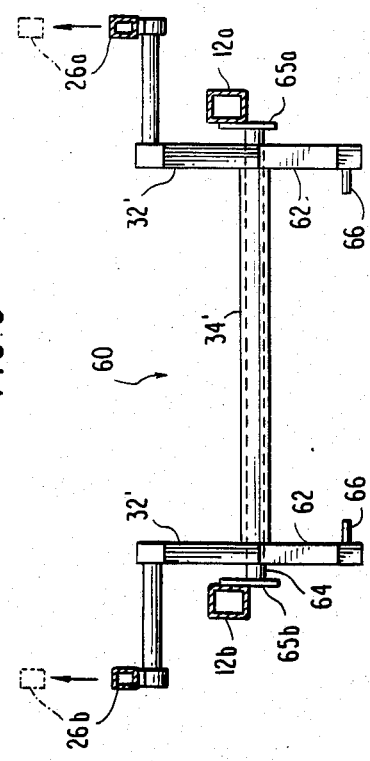

As best seen in the top plan view (FIG. 3) the lower elongated frame 10 consists of two longitudinal tubular members 12a and 12b (preferably of rectangular cross section as seen in FIGS. 4 and 5) which are interconnected by means of transverse members 14 to form an elongated rectangular structure.

Shown schematically at the rear of frame 10 (FIGS. 1 and 2) are wheels 15 which are secured in a conventional manner by the use of leaf springs and U-bolts (not shown), the U-bolts allowing the longitudinal adjustment of the wheels' location in the immediate vicinity of the center of gravity of the load to be carried.

At the forward end of the frame structure a conventional hitch 16 is provided together with a vertical subframe 18 for supporting a winch 20. Rearwardly of sub-frame 18 a horizontal arm 22 is secured for a reason to be explained later.

2. Upper frame structure

Also as best seen in the top plan view of FIG. 3 is an upper frame 24 consisting mainly of two longitudinal tubular members 26a and 26b interconnected at their forward end by means of members 28, 30a and 30b. Additionally transverse members similar to members 14 of lower frame 10 could be provided.

As seen in FIG. 3, the transverse distance between members 26a and 26b is such that the whole trailer structure can be easily inserted in the space existing between the two pontoons of a pontoon boat sitting with its pontoons are the ground.

3. Means connecting upper frame to lower frame

Pivotally attached to both the lower and upper frames are a plurality of pairs of connecting members 32 which are arranged so as to form a parallelogram configuration which allows the vertical raising of upper frame 24 relative to lower frame 10 while the frames remain parallel to one another (and substantially parallel to the ground).

One pair of such connecting members 32 is shown in FIG. 4. A circular rod or tube 34, supported by bearings 36a, 36b fixed to the underside of beams 12a and 12b, is secured by welding at 32a, 32b to connecting members 32. The other ends of members 32 are provided with stud shafts 38a, 38b journaled in bearings 30a, 40b fixed to the undersides of beams 26a, 26b.

4. Means for raising the upper frame

Figure 6A:
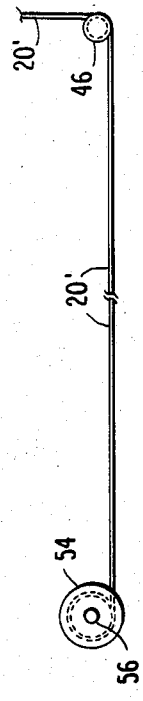
FIG. 6A is similar to FIG. 6 and shows another embodiment of the invention.
Figure 6:
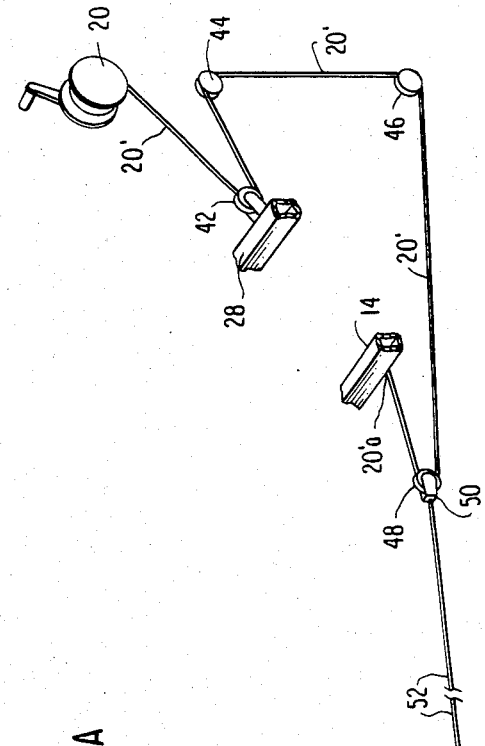
FIG. 6 is a schematic perspective view showing the mechanism used in the preferred embodiment for raising the upper frame relatively to the lower frame.

As best shown schematically in FIG. 6 and in FIG. 5, winch 20 has a cable 20' threaded about a first pulley 42 attached to transverse member 28 of upper frame 24. Cable 20' then passes around pulleys 44, 46 (fixed to lower frame 10), and then around pulley 48, and its end is secured at 20'a to the underside of the forwardmost transverse member 14 of lower frame 10.

Pulley 48 is provided with a yoke 50 secured to the end of a second cable 52. As seen in FIG. 6, the other end of cable 52 is wound clockwise about the periphery of a drum 54 which is keyed to a shaft 56. The ratio of the drum diameter to the shaft diameter is preferably 2:1 or greater, depending on design load.

As shown in FIG. 5, an interconnecting kicker arm arrangement 60 is disposed in the vicinity of shaft 56. Arm arrangement 60 is similar to the arm arrangement described in relation to FIG. 4; in addition, distances A and B are identical.

The only structural differences between the arm arrangement 60 of FIG. 5 and the arm arrangement of FIG. 4 are: (a) the location of arms 32' inside beams 12a and 12b, while arms 32 of FIG. 4 are located on the outside; and (b) the use of a tube 34' welded to arms 32' (FIG. 5) and surrounding fixed tube or rod 64 to provide a pivot for assembly 60, tube or rod 64 being welded to brackets 65a, 65b which, in turn, are welded to beams 12a and 12b, respectively.

As best seen in FIG. 6, a small arm 62 is welded to each of the arms 32' of arm arrangement 60 in the vicinity of shaft 64 and carries a pin 66 for securing one end of a third cable 68 having its other end wound counterclockwise about shaft 56 carrying drum 54.

As is clear from FIGS. 2 and 6, when winch 20 is operated, a certain lifting force is applied at the forward end of frame 24 at the attachment point of pulley 42. This force is simultaneously directed to pulley 48 where it is doubled and further multiplied as a result of (1) the arrangement of drum 54 and shaft 56 and (2) the location of lever arms 62 corresponding to the collapsed position of frame 24. A bell crank is formed by each of the welded arms 32' and 62. The length of arms 62 is determined by the desired ground clearance as shown in FIG. 2. In a typical trailer, arms 62 may have a length of 12 inches, and each arm 32' a length of 18 inches. In any event, as shown in FIGS. 2 and 6, the maximum effective level arm length of the bell cranks (and, thus, the maximum lifting force at the rear) occurs in the lowermost or collapsed position (FIG. 2) of the trailer. However, this effective lever arm decreases as the transverse distance between the upper and lower frames increases as the upper frame is raised, until the effective lever arm is substantially zero in the fully raised position where arms 62 are horizontal and aligned with shaft 56. Thus, when the trailer is to be raised to lift a load such as a boat, the lifting force applied by winch 20 is, at first, primarily applied to the rear of the trailer, but, due to the self-equalizing effect produced by the essentially single cable exerting pulling forces at both the front and rear of the trailer, the maximum lifting force is automatically transferred from the rear to the front as the upper frame 24 rises, i.e., as the transverse distance between the upper and lower frames increases.

FIG. 6A illustrates another embodiment of the invention wherein the pulley block 48, 50 and the attachment of cable 20' at point 20'a are eliminated so that the same cable 20' effectively exerts pulling forces on both the front and rear ends of upper frame 24 via pulley 42 and kicker arm assembly 60, respectively. Pulley block 48, 50 merely provides a mechanical advantage which is not necessary for light loads; the embodiments of both FIGS. 6 and 6A achieve the same self-equalizing effect or automatic distribution of lifting forces so that these forces match the changing load as the upper frame is moved from a fully collapsed position, through 45 degrees of elevation, to the fully upright position.

It should be noted in this respect that the kicker arm assembly 60 is preferably located in the wheel area, i.e., at a location substantially vertically aligned with the load center of gravity.

As shown in FIG. 1, once the upper frame has been raised, it can be physically connected by means of a pin 70 (for example) to arm 22, and, consequently, the tension applied to cable 20' can be relieved.

Thus, my invention provides an extremely economical and effective lifting frame apparatus which finds particular utility in a lifting trailer for boats, particularly pontoon boats. Prior designs, in which the lifting force is applied only to the front end of the upper lifting frame, require that the lower travel of the upper frame be blocked so that the frame connecting members do not go over center where no amount of applied force would be capable of raising the load; of course, my invention has no such requirement or limitation. The problem with this prior design was compounded by the fact that the majority of weight on such trailers is located toward the rear, thereby causing the lifting frame to lock up and also requiring enormous forces during the initial lifting sequence when attempting to raise the frame from its fully collapsed position. My invention, with its self-equalizing mechanism, directly overcomes these problems by transferring the lifting force of the winch and cable directly to the rear of the upper frame, while at the same time applying a balanced force to the forward part of the frame. Furthermore, the unique combination of the dual diameter drum 54 and shaft 56 assembly with the kicker arms 62 welded directly to the lifting arms 32' overcomes all known limitations of this type of lifting mechanism. As has already been described, the sequence of operation of my invention is such that the initial force applied by the winch 20 is directly transferred to the front of the lifting frame 24 through a block pulley 42. Simultaneously, this force is applied rearwardly to the large diameter drum 54 which transfers the pulling force to the smaller diameter shaft 56. The various pulleys, together the drum and shaft arrangement, provide a great force multiplication or mechanical advantage. This force is applied to the kicker arms 62, and the vertical lift applied to the upper frame at this time is now a product of the length of the arms 32' compared to the length of the kicker arms 62. Thus, when the frame is raised from its fully collapsed position, maximum force is applied to the frame by the kicker arm assembly 60, with the front pulley 42 providing an equalizing function. As the upper frame 24 rises, the kicker arm assembly 60 automatically starts to lose its mechanical advantage (as the cables 68 and kicker arms 62 move toward alignment with each other), and the front lifting mechanism gradually becomes the primary energy input to the system. Thus, the entire system automatically transfers the lifting energy to that part of the system which needs it the most and also automatically applies the correct and balanced force at the critical points.

While I have described preferred embodiments of my invention, it is clear that obvious variations of the invention will become apparent to those skilled in the art. Therefore, the scope of the invention is limited to only that defined by the following claims.

I claim:

1. A trailer frame apparatus, particularly intended for use with pontoon boats, catamarans and the like, and comprising:
   (a) an elongate lower frame (10),
   (b) an elongate upper frame (24),
   (c) a plurality of spaced coupling arms (32) individually and pivotally connected at opposite ends thereof between the upper and lower frames to define therewith a parallelogram configuration with the upper frame longitudinally and transversely displaceable with respect to the lower frame in a pivotal mode,
   (d) a winch (20) mounted on the lower frame proximate a forward end thereof and at an elevated, or the same, height relative to a raised, uppermost position of the upper frame,
   (e) drum means rotatably mounted on the lower frame proximate a rear end thereof,
   (f) bell crank means (60), pivotally mounted at an elbow portion thereof on the lower frame proximate the rear end thereof, for applying a lifting force to the rear end of said upper frame, and comprising angled first and second arms (62, 32'), the second arm (32') being connected at a distal end thereof to the upper frame,
   (g) a first pulley (42) fixed to the forward end of said upper frame,
   (h) cable means (20') for transferring a lifting force to the rear and forward ends of said upper frame, and having one end wound around said winch, said cable means passing around said pulley and said drum means and having its other end fixed to said first arm (62) of said bell crank means, whereby, with a load supported on the upper frame in a lowered position thereof, tension applied by said winch to said cable means to raise the upper frame will initially exert more lifting force on the rear end of said upper frame than on the front end, and, in an inherently automatic and transitional manner, will exert more lifting force on the front end of said upper frame as it is raised to said upper most position.

2. A trailer frame apparatus as defined in claim 1 further comprising a second pulley (48) and wherein:

said drum means comprises a first winding portion (54) having a first diameter, and a second winding portion (56) having a second, smaller diameter; and said cable means comprises:

a first cable (20') wound around said winch (20) and threaded through said second pulley (48) and having its free end attached to said lower frame;

a second cable (52) having its free end attached to said second pulley and its other end wound around said first winding portion (54); and a third cable (68) having its free end attached to said first arm (62) of said bell crank means and its other end wound around said second winding portion (56).

3. A trailer frame apparatus as defined in claim 2 wherein said second arm (32') has a length substantially equal to that of said coupling arms (32) and is pivotally connected at a distal end thereof to said upper frame.

* * * * *